H. R. MASON.
BRAKE GEAR FOR VEHICLES.
APPLICATION FILED DEC. 28, 1917.
1,413,865.
Patented Apr. 25, 1922.
4 SHEETS—SHEET 2.
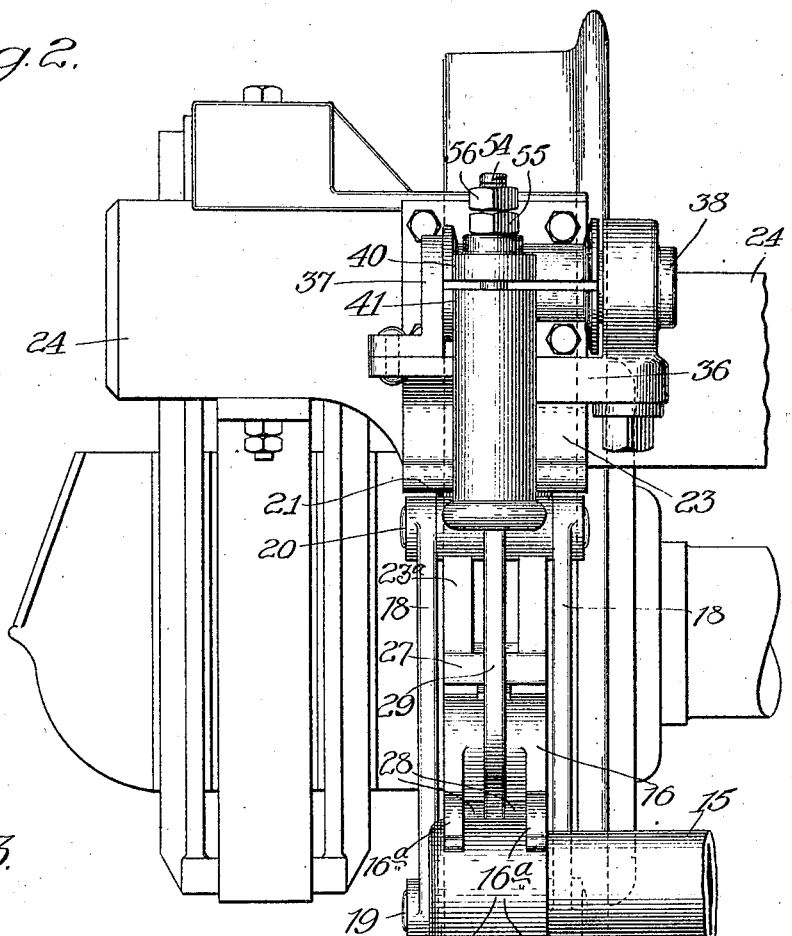
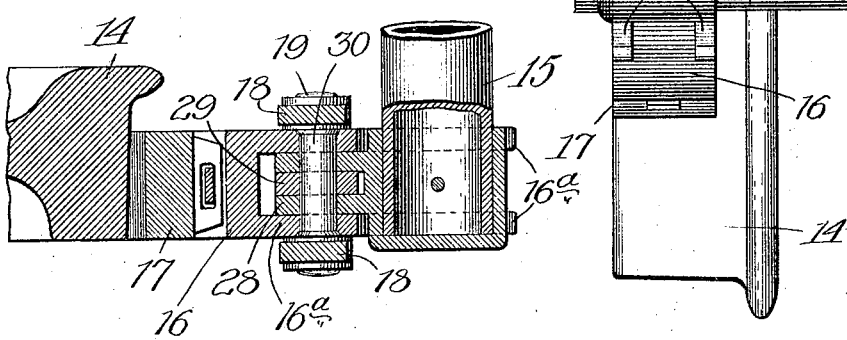

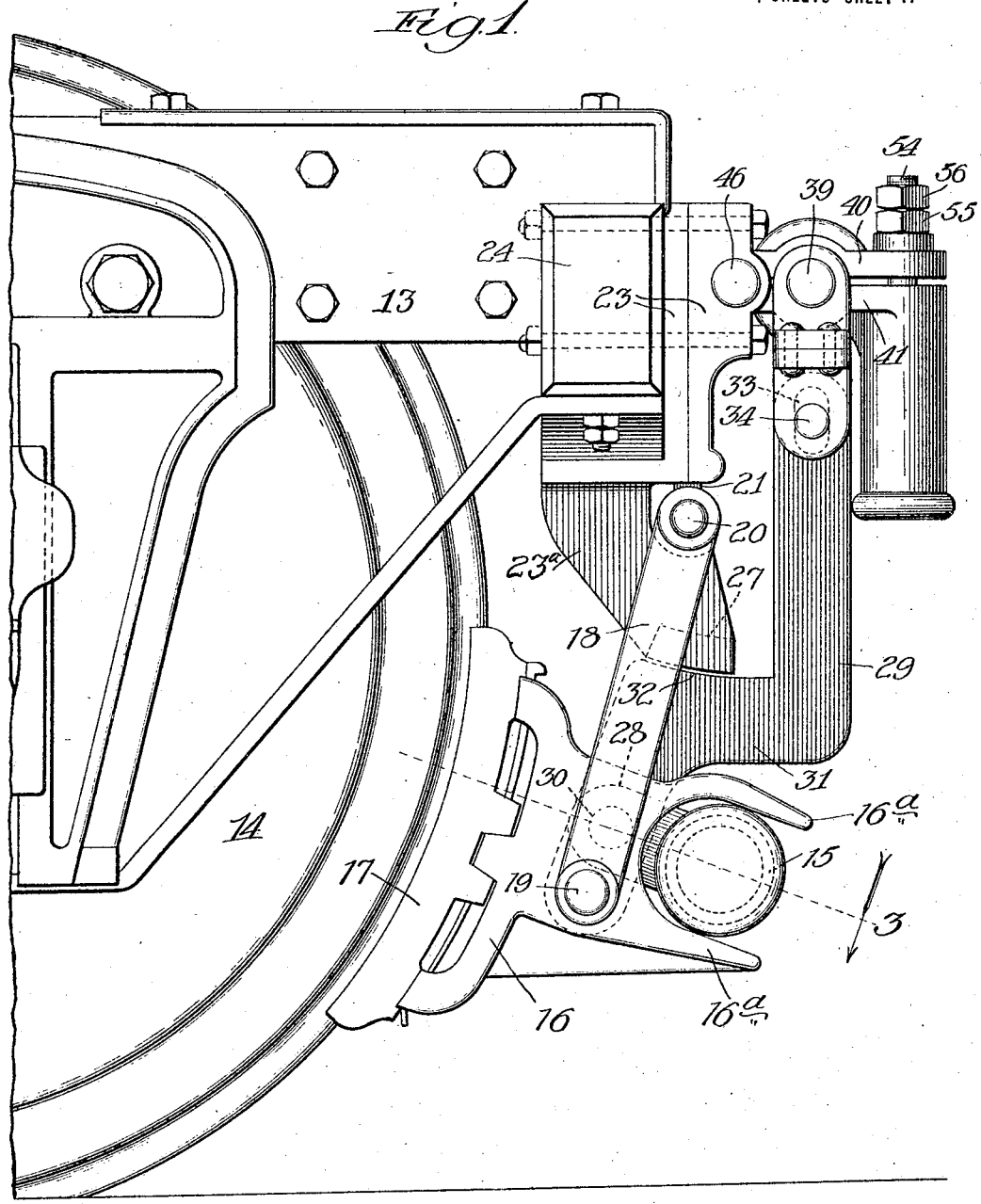

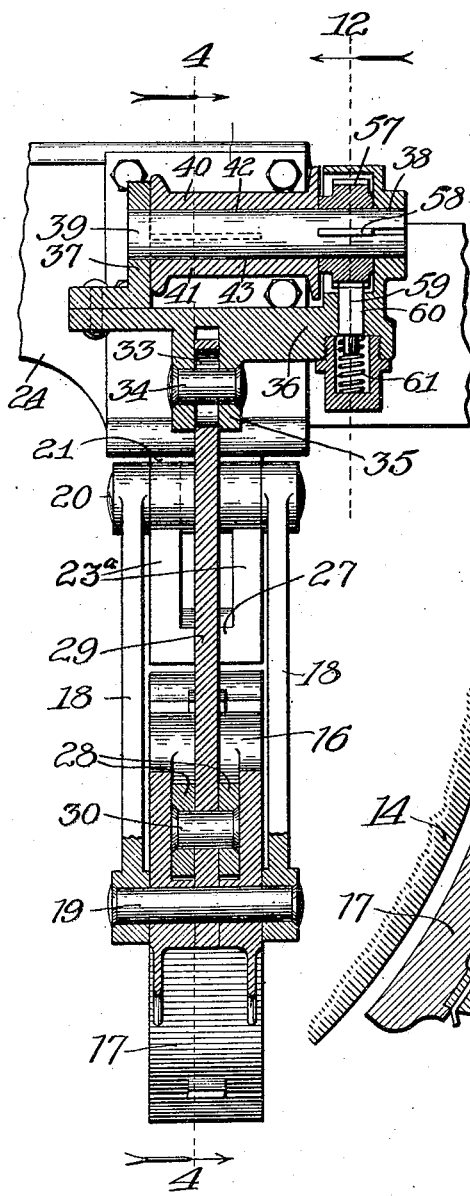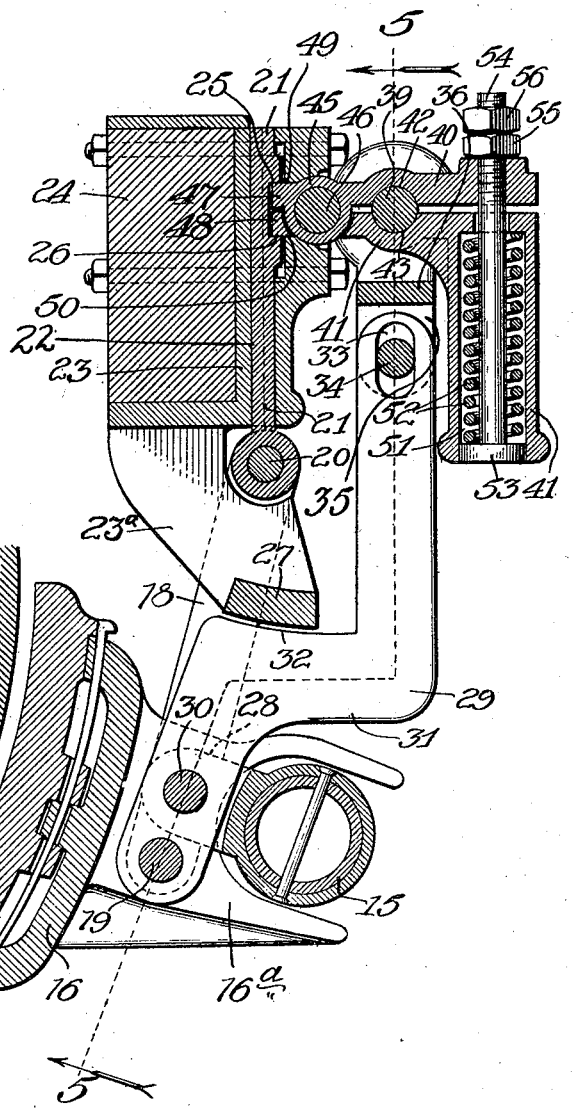

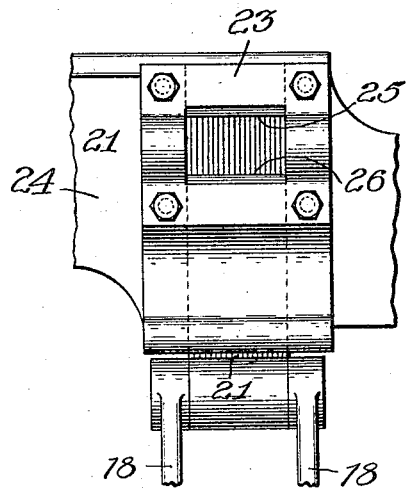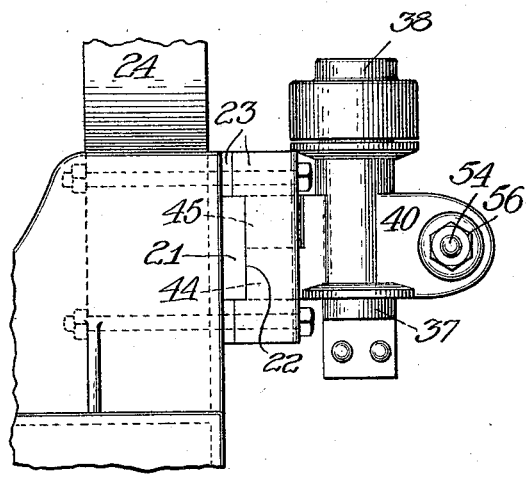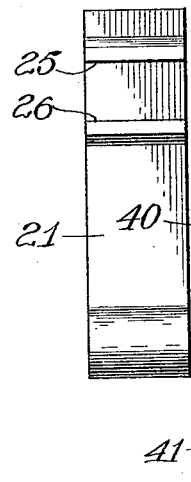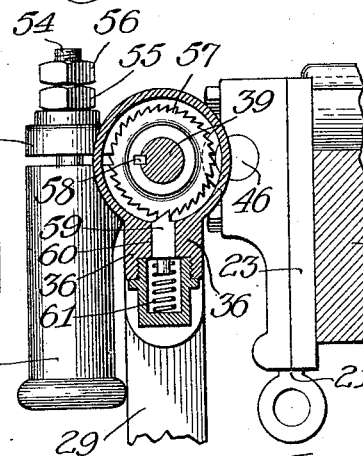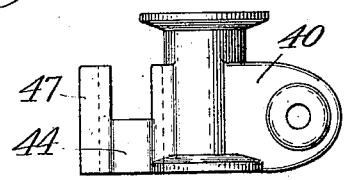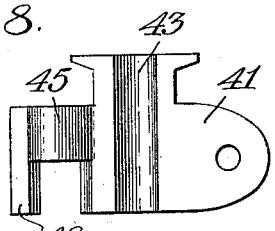

UNITED STATES PATENT OFFICE.

HARRY R. MASON, OF CHICAGO, ILLINOIS.

BRAKE GEAR FOR VEHICLES.

1,413,865.          Specification of Letters Patent.    Patented Apr. 25, 1922.

Application filed December 28, 1917. Serial No. 309,201.

*To all whom it may concern:*

Be it known that I, HARRY R. MASON, a citizen of the United States, residing at Chicago, in the county of Cook and State of Illinois, have invented a new and useful Improvement in Brake Gears for Vehicles, of which the following is a specification.

Brake-gear as commonly provided when operated to brake the wheels of a vehicle, presents the serious disadvantage, under certain conditions of use, of gripping the wheels with such firmness that the wheels cease to rotate while the vehicle continues its movement, the wheels thus sliding on the rails and producing what is commonly termed "flat-wheels."

While the arresting of the rotation of the wheels may occur as to all of the wheels of a vehicle, which are operated as a unit from a single air-pressure operated mechanism, this arresting of the rotation of the wheels commonly occurs as to certain only of the wheels where the relations of the wheels and the brake-gear are such, or such other conditions exist, that the grip of the shoes on the wheels exceeds that of the other shoes.

The skidding action referred to is probably caused, in most cases, by one of the brake-shoes becoming stuck or locked to the wheel with such firmness as to break the adhesion between the wheel and the rail of the two wheels of the set which in accordance with common practice are rigidly secured to a single axle, thereby throwing substantially all of the retarding force of the set of wheels on the one brake hanger for the moment.

Various means for preventing "flat-wheels" have been devised, but so far as it is known to me such means have involved the reduction of the air-pressure supplied to the brake mechanism which presents many disadvantages of which the chief one is that in the event of the reduction of the air-pressure of the entire system on a vehicle, by the operation of the portions of the brake mechanism co-operating with any set of wheels for reducing the pressure exerted by the brakes on such set of wheels, the braking force exerted by the brakes for all the other sets of wheels is simultaneously reduced, regardless of the pressure applied by such other brakes, thus causing all of the brakes on the vehicle to be partially released and, therefore, impairing the braking function.

My primary objects, generally stated, are to provide novel, simple, and positively operating mechanism which shall operate automatically to prevent "flat-wheels" regardless of the particular conditions of the track, and which will operate for each wheel independently of the others thereof, to relieve the braking-pressure exerted by those brakes only which grip the wheels sufficiently to produce "flat-wheels" if not relieved, and thus ensure the obtaining of the maximum braking-effect; to provide for the maximum braking action of a brake and reduce its braking action only when the pressure applied by the brake, if it were to continue, is sufficient to cause the wheel to stop rotating while the vehicle is in motion; and to provide for the rapid return of the brake mechanism to its normal position, upon the release of the brake, in order that it may be again operated under normal conditions.

Referring to the accompanying drawings:

Fig. 1 is a broken view in side elevation, of a truck of a car, showing a portion of one of the wheels thereof, to which my improved brake-gear is applied. Fig. 2 is a view in end elevation of the structure shown in Fig. 1, the structure being viewed from the righthand side in this figure. Fig. 3 is a section taken at the line 3 on Fig. 1 and viewed in the direction of the arrow, the wheel with which the brake cooperates, being shown partly broken away. Fig. 4 is a view in sectional elevation of a part of the structure shown in Fig. 1, the section being taken at the line 4—4 on Fig. 5 and viewed in the direction of the arrows. Fig. 5 is a section taken at the irregular line 5—5 on Fig. 4 and viewed in the direction of the arrows. Fig. 6 is a plan view of a portion of the structure shown in Fig. 1, certain parts being broken away. Figs. 7 and 8 are plan views of the sectional clutch members forming a part of the structure of the preceding figures. Fig. 9 is a plan view of a supporting member for the mechanism of which the sections shown in Figs. 7 and 8 are parts. Fig. 10 is a view in elevation viewed from the righthand side of Fig. 4 of a portion of the lever mechanism of the brake-gear which directly co-operates with the clutch mechanism referred to, together with the guide for the same, the clutch mechanism being removed. Fig. 11 is a face view of the clutch operating member of Fig. 10 which operates in the guide member of said figure; and Fig. 12 a section taken at the line 12 on Fig. 5 and viewed in the direction of the arrow.

A portion of the truck of a car is represented at 13, this truck being equipped with wheels, one of which is represented at 14. In the particular construction shown, my invention is illustrated as applied to a car employing air-pressure operated brake-beams in accordance with common practice, one of these brake-beams being represented at 15 and in the operation of the air-pressure operated mechanism of the car, to apply the brakes, swinging toward the wheel to the left in Fig. 1.

In accordance with the preferred embodiment of my invention, the brake-head represented at 16 and carrying the brake-shoe 17 for co-operation with the wheel 14, is hung from a pair of rods 18 spaced apart and connected with the head 16 through the medium of a pivot-pin 19, these rods extending upwardly and being pivoted, through the medium of a pin 20 with a reciprocable bar 21 guidingly confined in a channel 22 in a guide member 23 rigidly secured to a cross member 24 of the truck 13, this bar being provided on one face with upper and lower shoulders 25 and 26 spaced apart for co-operation with clutch mechanism hereinafter described, the member 23 having a depending portion 23ª presenting a lug 27 with the under surface of which a lever hereinafter described and connected with the brake-head, co-operates.

Extending at its lower end through a bifurcated portion 28 on the brake-beam 15 which is located in a bifurcated portion 16ª of the brake-head 16, is a lever 29 pivotally connected at its lower extremity with the pin 19 and pivotally connected above the pin 19, with the yoke-portion 28 through the medium of a pin 30. The lever 29 above these pivots is laterally offset, as represented at 31, to provide a surface 32 for co-operation with the underside of the lug 27 as hereinafter described, this lever at the upper extremity of its opposite portion containing an elongated slot 33 at which it straddles a pin 34 mounted in the depending, bifurcated, portion 35 of a head 36 providing spaced bearings 37 and 38 in which a shaft 39, from which the member 36 is hung, is journaled at its ends. The shaft 39 is located in, and supported by, a clutch-device formed of upper and lower clutch-members 40 and 41, respectively, these members being curved as indicated at 42 and 43 respectively, at the surfaces thereof which contact the shaft 39. The members 40 and 41 are preferably of the form shown in Figs. 7 and 8 respectively, and are mounted at bearing portions 44 and 45 upon a shaft 46 secured at its ends in the member 23. The bearing portions 44 and 45 are relatively narrow, as shown, and extend in alignment with each other and beyond these bearing portions the members 40 and 41 are provided with elongated lugs 47 and 48 respectively, which extend into the space between the shoulders 25 and 26 on the bar 21, these lugs co-operating with shoulder portions 49 and 50 on the member 23 for a purpose hereinafter explained. The member 41 at the other side of the shaft 39 contains a socket 51 housing a coiled spring 52 which co-operates with the head 53 of a plunger 54 extending upwardly through the member 41 and through the member 40, the upper end of this plunger being threaded and carrying nuts 55 and 56, one of which is a lock-nut, the spring 52 operating to clamp the members 40 and 41 about the shaft 39 for a purpose hereinafter explained. The shaft 39 carries a ratchet-wheel 57 non-rotatably supported thereon as by the key 58, this ratchet-wheel co-operating with a dog 59 reciprocably mounted in a guide-way 60 in the member 36 and backed by a spring 61 which releasably holds the dog in engagement with the ratchet, these parts being so constructed and arranged as shown that the tooth of the dog 59 engages the shouldered portions of the teeth of the ratchet which prevents rotation of the member 36 in clockwise direction in Fig. 4, unless the pin 39 rotates with this member, but permits the member 36 to freely rotate on the shaft 39 in anti-clockwise direction in Fig. 4.

The normal position of the brake mechanism is that illustrated in the drawings. When the air-brake mechanism of the car is operated, the brake-beam 15 swings to the left in Figs. 1 and 4 and through the medium of its connection with the brake-head 16, by means of the lever 29 and pin 19, the brake-shoe is moved into frictional engagement with the wheel 14. In the said movement of the parts, the lever 29 swings, and slides, upon the pin 34, the member 36 being held against clockwise rotation in Fig. 4 by the clutching action of the members 40 and 41 under the pressure exerted by the spring 52, and the rods 18 swing at the pivot 20 on the clutch-releasing bar 21, the surfaces 27 and 32 remaining out of contact during this movement of the parts. The brake-shoe 17 in gripping the wheel 14 is caused to exert upward or downward movement depending upon whether the wheel is rotating in anti-clockwise direction or in clockwise direction in Fig. 4 and thus exerts an upward or downward thrust, as the case may be, upon the rods 18 and consequently upon the clutch-releasing member 21. So long as this upward or downward thrust on the bar 21 is not sufficient to overcome the resistance of the spring 52, the member 36 is held in normal position with the surfaces 27 and 32 out of contact with each other, but as soon as this upward or downward pressure exceeds that of the spring 52, the grip of the clutch formed of the members 40, 41, on the shaft 39, releases, thus permitting the member 36 to rotate in clockwise direction in Fig. 4 with the result of causing the surface 32 of the lever 29 to abut the lug 27, thereby reducing the leverage exerted by the brake-beam 15 against the brake-head and commensurately relieving the pressure exerted by the shoe against the wheel, it being understood that when the bar 21 is pulled downwardly to release the clutch mechanism as stated, the member 41 is prevented from turning by engagement of this lug 48 with the surface 50 and when the member 21 is pushed upwardly to release the clutch mechanism the member 40 is prevented from turning by engagement of this lug 47 with the surface 49.

It will be noted from the foregoing that the particular illustrated embodiment of my invention operates upon the principle of automatically reducing the power exerted by the brake-beam upon the brake-shoe when the force exerted by the shoe in an upward or downward direction, depending upon the direction in which the wheel is rotating, exceeds a predetermined degree.

In the equipping of vehicles with my invention, it is desirable that one of the mechanisms described and illustrated be associated with each brake-shoe and as the automatic relieving of the braking-pressure, as hereinbefore described, is accomplished without reducing the applied air-pressure, the relieving of the pressure exerted by the brake-shoe of any wheel by the existence of such conditions as will cause the bar 21 to overcome the resistance of the spring 52 and release the clutch, will not affect the normal operation of the brakes co-operating with the other wheels, which is a great advantage inasmuch as conditions might arise as to the brake mechanism for one wheel or wheels which would cause the brake mechanism for this particular wheel or wheels to release before the brakes of the other wheels have even approximated a maximum braking effect.

It will be readily understood that it is desirable that provision be made for securing as nearly as possible, the maximum braking effect, and in accordance with the preferred embodiment of my invention, I provide for the obtaining of substantially the maximum braking effect, by so adjusting the spring 52 that the clutch-device controlled thereby is released only when the upward or downward thrust exerted against the clutch-releasing bar 21 exceeds the degree of thrust imposed upon this bar when the brakes are exerting their maximum power. In this connection it may be stated that between the time of initial application of the brake and the skidding of the wheel co-operating therewith, the brake-shoe is caused to be forcibly jerked upwardly or downwardly, depending upon the direction of rotation of the wheel, and it has been found by the making of tests that the force exerted upwardly or downwardly by the brake-shoe, when the jerking action above referred to occurs, is greatly increased over the force exerted upwardly or downwardly, as the case may be, by the brake-shoe under ordinary conditions. This increase in force, by reason of its degree thereof provides a very wide margin between maximum braking effect and a braking action which, if continued, would cause "flat-wheels" to be produced, so that if the brake apparatus is set to become released when this jerking action takes place, it will permit the apparatus to operate in practice under the varying conditions which are presented. I, therefore, prefer to so adjust the spring 52 to the various brake mechanisms that the resistance of the same will not be overcome until the jerking action of the brake-shoe, as above stated, has occurred. By such as arrangement the maximum braking effect exerted by the brakes may be obtained as to all of the brakes of a vehicle and in the event that a condition is brought about which would result in any of the wheels ceasing to rotate while the vehicle is in motion and thus producing "flat-wheels" if allowed to skid along the track for a considerable distance, the braking-pressure exerted by the brake for that particular wheel will be reduced without affecting the pressure exerted by the brakes for the other wheels.

It will also be understood that the changing of the fulcrum point of the lever 29 from its connection with the pin 34 to the abutment 27, to vary the power exerted by the brake-beam against the brake-head, will depend upon the particular conditions presented by the vehicle to which the mechanism is applied, it being necessary, however, that the length of the effective portion of the lever 29 from the pivot 30 to the abutment 27, as compared with the leverage between the pivots 19 and 30, be such that under the maximum air-pressure applied in use to operate the brakes, the pressure exerted by the brake-beam against the brake-head will be insufficient to cause the brake-shoe to grip the wheel with such pressure that the latter ceases to rotate while the car is in motion.

When the air-brakes of the car are released by the operator in accordance with common practice, at which time the shaft 39 is gripped by the clutch mechanism hereinbefore described, the member 36 is free to swing by gravity to normal position (Fig. 4) by reason of the ratchet and pawl arrangement provided as stated, and all of the parts of the mechanism return to the position shown in this figure.

The under surface of the lug 27 and the surface 32 of the lever 29 are so shaped and bear such relations to each other as shown, and the lever 29 so supported, viz. at the slotted portion 33, as to cause these surfaces to remain out of contact with each other in the normal operation of the brake mechanism regardless of the wear of the braking surface of the brake-shoe, but to become into abutting relationship immediately following the release of the clutch from the shaft 39 which permits the fulcrum 34 of the lever 29 to swing to the left in Fig. 4.

While I have illustrated and described a particular construction embodying my invention, I do not wish to be understood as intending to limit it thereto, as the same may be variously modified and altered without departing from the spirit of my invention.

What I claim as new and desire to secure by Letters Patent is—

1. The combination with a vehicle, of braking-mechanism for the wheels of the vehicle, and means associated with said braking mechanism operating automatically to reduce the pressure of the brakes against any one of the wheels to prevent flattening of the wheel, without affecting the braking-pressure against the others of the wheels.

2. The combination with a vehicle, of braking-mechanism for the wheels of the vehicle, and means associated with said braking mechanism operating automatically to reduce the pressure of the brakes against any one of the wheels when the force exerted by the brakes in a direction tangentially of that wheel, exceeds a predetermined degree, without affecting the braking-pressure against the others of the wheels.

3. The combination with a vehicle, of braking devices for the respective wheels thereof, a single mechanism from which said braking devices are operated, and a plurality of individually-operative means cooperating with the respective braking devices and operating automatically to reduce the braking pressure applied to certain of said wheels to prevent flattening thereof, without effecting the braking pressure exerted by the braking devices cooperating with the others of said wheels.

4. The combination with a vehicle, of sets of braking devices for the respective sets of wheels of the vehicle, a single mechanism from which said braking devices are operated, and a plurality of individually-operative means cooperating with the respective braking devices and operating automatically, when the force exerted by any of the braking devices in a direction tangentially of the wheels, exceeds a predetermined degree, to reduce the braking pressure applied to said set or sets of wheels, without affecting the braking pressure exerted by the braking devices cooperating with the other sets of wheels.

5. The combination with a vehicle, of sets of braking devices for the respective wheels thereof, a single mechanism from which said braking devices are operated, and means operating automatically to reduce the power exerted by said mechanism against said braking devices, without reducing the power exerted against said first-named means from said source, to prevent flattening of the wheels.

6. The combination with a vehicle, of sets of braking devices for the respective wheels thereof, a single mechanism from which said braking devices are operated, and means operating automatically to reduce the power exerted by said means against said braking devices without reducing the power exerted against said first-named means from said source, when the force exerted by the braking devices in a direction tangentially of the wheels exceeds a predetermined degree.

7. The combination with a vehicle, of a braking-device for a wheel of the vehicle, means for actuating said device to brake the wheel, and means operating automatically to reduce the power exerted by said means against said braking-device to prevent flattening of the wheel, said last-named means including a shiftable member with which said first-named means and said braking-device are connected and through the medium of which said braking-device is operated, and fulcrums spaced apart and co-operating with said shiftable member and between which and said braking device said first-named means are connected.

8. The combination with a vehicle, of a braking-device for a wheel of the vehicle, means for actuating said device to brake the wheel, and means operating automatically to reduce the power exerted by said means against said braking-device when the thrust exerted by the braking device in a direction tangentially of the wheel exceeds a predetermined degree, said last-named means including a shiftable member with which said first-named means and said braking-device are connected and through the medium of which said braking-device is operated, and fulcrums spaced apart and co-operating with said shiftable member and between which and said braking-device said first-named means are connected.

9. The combination with a vehicle, of a braking-device for a wheel of the vehicle, a shiftable device, means operating through the medium of said shiftable device for actuating said braking-device, means normally restraining movement of said shiftable device, means, controlled by said braking device for actuating said last-named means to permit said shiftable device to move, and means co-operating with said shiftable device for changing the leverage exerted against said braking-device by said first-named means upon said movement of said shiftable device.

10. The combination with a vehicle, of a braking-device for a wheel of the car, a shiftable device, means operating through the medium of said shiftable device to actuate said braking-device, means normally restraining movement of said shiftable device, means controlled by said braking-device for actuating said last-named means to permit said shiftable device to move when the force exerted by said braking-device in a direction tangentially of the wheel, exceeds a predetermined degree, and means co-operating with said shiftable device for changing the leverage exerted against said braking-device by said first-named means upon said movement of said shiftable device.

11. The combination with a vehicle, of a braking-device for a wheel of the vehicle, a shiftable device, means operating through the medium of said shiftable device to actuate said braking-device, clutch mechanism normally restraining movement of said shiftable device, means controlled by said braking device for releasing said clutch mechanism to permit said shiftable device to move, and means co-operating with said shiftable device for changing the leverage exerted against said braking-device by said first-named means upon said movement of said shiftable device.

12. The combination with a vehicle, of a braking-device for a wheel of the vehicle, a shiftable device, means operating through the medium of said shiftable device to actuate said braking-device, clutch mechanism normally restraining movement of said shiftable device, means controlled by said braking-device for releasing said clutch mechanism to permit said shiftable device to move when the force exerted by the braking device in a direction tangentially of the wheel, exceeds a predetermined degree, and means co-operating with said shiftable device for changing the leverage exerted against said braking-device by said first-named means upon said movement of said shiftable device.

13. The combination with a vehicle, of a braking-device for a wheel of the vehicle, a shiftable member, a lever fulcrumed on said member and operatively engaging said braking-device, means for actuating said braking-device engaging said lever between the points at which the latter engages said member and operatively engages said braking-device, means normally restraining movement of said shiftable member, means controlled by said braking-device for actuating said last-named means to permit said shiftable member to move, and a member positioned to engage said lever between the point at which it is fulcrumed on said shiftable member and the point at which power is applied to said lever by said first-named means, upon the shifting of said shiftable member.

14. The combination with a vehicle, of a braking-device for a wheel of the vehicle, a shiftable member, a lever fulcrumed on said member and operatively engaging said braking-device, means for actuating said braking-device engaging said lever between the points at which the latter engages said member and operatively engages said braking-device, means normally restraining movement of said shiftable member, means controlled by said braking-device for actuating said last-named means to permit said shiftable member to move when the force exerted by the braking-device in a direction tangentially of the wheel exceeds a predetermined degree, and a member positioned to engage said lever between the point at which it is fulcrumed on said shiftable member and the point at which power is applied to said lever by said first-named means upon the shifting of said shiftable member.

15. The combination with a vehicle, of a braking-device for a wheel of the vehicle, a shiftable member, a lever fulcrumed on said member and operatively engaging said braking-device, means for actuating said braking-device engaging said lever between the points at which the latter engages said member and operatively engages said braking-device, clutch mechanism for normally restraining movement of said shiftable member, means controlled by said braking-device for actuating said clutch mechanism to permit said shiftable member to move, and a member positioned to engage said lever between the point at which it is fulcrumed on said shiftable member and the point at which power is applied to said lever by said first-named means, upon the shifting of said shiftable member.

16. The combination with a vehicle, of a braking-device for a wheel of the vehicle, a shiftable member, a lever fulcrumed on said member operatively engaging said braking-device, means for actuating said braking-device engaging said lever between the points at which the latter engages said member and operatively engages said braking-device, clutch mechanism for normally restraining movement of said shiftable member, means controlled by said braking-device for actuating said clutch mechanism to permit said shiftable member to move when the force exerted by the braking-device in a direction tangentially of the wheels, exceeds a predetermined degree, and a member positioned to engage said lever between the point at which it is fulcrumed on said shiftable member and the point at which power is applied to said lever by said first-named means, upon the shifting of said shiftable member.

17. The combination with a vehicle, of braking-mechanism for the wheels of the vehicle and means associated with said braking mechanism operating automatically to reduce the pressure of the brakes against any of the wheels in the rotation of the latter in either direction to prevent flattening of the wheels, without affecting the braking-pressure against the others of the wheels.

18. The combination with a vehicle, of braking-mechanism for the wheels of the vehicle and means associated with said braking mechanism operating automatically to reduce the pressure of the brakes against any one of the wheels in their rotation in either direction, when the force exerted by the braking-mechanism in a direction tangentially of that wheel, exceeds a predetermined degree, without affecting the braking-pressure against the others of the wheels.

19. The combination with a vehicle, of braking devices for the wheels thereof, a single mechanism from which said braking devices are operated, and a plurality of individually-operative means cooperating with the respective braking devices and operating automatically to reduce the braking pressure applied to certain of said wheels, without affecting the braking pressure exerted by the braking devices cooperating with the others of said wheels in the rotation of the wheels in either direction.

20. The combination with a vehicle, of braking devices for the respective wheels thereof, a single mechanism from which said braking devices are operated, and a plurality of independently-operative means cooperating with the respective braking devices and operating automatically in the rotation of said wheels in either direction, to reduce the braking pressure applied to certain of said wheels, without affecting the braking pressure exerted by the braking devices co-operating with the others of said wheels when the force exerted by the braking devices in a direction tangential of the wheels exceeds a predetermined degree.

21. The combination with a vehicle, of a braking-device for a wheel of the vehicle, means for actuating said device to brake the wheel, and means operating automatically, in the rotation of the wheel in either direction, to reduce the power exerted by said means against said braking-device, said last-named means including a shiftable member with which said first-named means and said braking-device are connected and through the medium of which said braking-device is operated, and fulcrums spaced apart and co-operating with said shiftable member and between which and said braking-device said first-named means are connected.

22. The combination with a vehicle, of a braking-device for a wheel of the vehicle, means for actuating said device to brake the wheel, and means operating automatically, in the rotation of the wheel in either direction, to reduce the power exerted by said means against said braking-device when the force exerted by the braking-device in a direction tangentially of the wheel, exceeds a predetermined degree, said last-named means including a shiftable member with which said first-named means and said braking-device are connected and through the medium of which said braking-device is operated, and fulcrums spaced apart and co-operating with said shiftable member and between which and said braking-device said first-named means are connected.

23. The combination with a vehicle, of a braking-device for a wheel of the vehicle, a shiftable device, means operating through the medium of said shiftable-device to actuate said braking-device, means normally restraining movement of said shiftable device, means controlled by said braking-device and operating in the rotation of the wheel in either direction to actuate said last-named means to permit said shiftable device to move, and means cooperating with said shiftable device for changing the leverage exerted against said braking-device by said first-named means, upon said movement of said shiftable device.

24. The combination with a vehicle, of a braking-device for a wheel of the vehicle, a shiftable device, means operating through the medium of said shiftable device to actuate said braking-device, clutch mechanism normally restraining movement of said shiftable device, mechanism controlled by said braking-device in the rotation of the wheel in either direction for actuating said clutch-mechanism to permit said shiftable device to move, and means co-operating with said shiftable device for changing the leverage exerted against said braking-device by said first-named means upon said movement of said shiftable device.

25. The combination with a vehicle, of a braking-device for a wheel of the vehicle, a shiftable device, means operating through the medium of said shiftable device to actuate said braking-device, clutch mechanism normally restraining movement of said shiftable device, a shiftable member operating in its movement in either direction to release said clutch means to permit said shiftable device to move, said shiftable member being operatively connected with said braking-device for actuation through the medium of the latter, and means co-operating with said shiftable device for changing the leverage exerted against said braking-device by said first-named means upon said movement of said shiftable device.

26. The combination with a vehicle, of a braking-device for a wheel of the vehicle, a shiftable member, a lever having sliding pivot connection with said member, said pivot connection forming a fulcrum for said lever, said lever operatively engaging said braking-device, means for actuating said braking-device engaging said lever between the points at which the latter engages said member and operatively engages said braking-device, means normally restraining movement of said shiftable member, means controlled by said braking-device for actuating said last-named means to permit said shiftable member to move, and a member positioned to engage said lever between the point at which it is fulcrumed on said shiftable member and the point at which power is applied to said lever by said first-named means, upon the shifting of said shiftable member.

27. The combination with a vehicle of a braking-device for a wheel of the vehicle, a shiftable member carrying a fulcrum-pin, a lever containing an elongated slot through which said pin extends, said lever operatively connecting said braking-device, means for actuating said braking-device engaging said lever between the points at which the latter engages said member and operatively engages said braking-device, means normally restraining movement of said shiftable member, means controlled by said braking-device for actuating said last-named means to permit said shiftable member to move, and a member positioned to engage said lever between the point at which it is fulcrumed on said shiftable member and the point at which power is applied to said lever by said first-named means, upon the shifting of said shiftable member.

28. The combination with a vehicle, of braking-devices co-operating with the wheels of the vehicle, means for applying pressure to said braking devices, and automatically operating means adapted to reduce the braking power on any individual wheel when the brakes of that wheel lock such wheel against rotation.

29. The combination with a vehicle, of braking-devices co-operating with the wheels of the vehicle, means for applying pressure to said braking devices and including brake-beams, and automatically operating means adapted to transfer a portion of the power delivered to any of the braking devices, directly to the vehicle when such braking device locks the wheel with which it co-operates against rotation.

30. The combination with a vehicle, of braking-devices co-operating with the wheels of the vehicle, means for applying pressure to said braking devices for setting the brakes, and means operating automtaically to reduce the braking power on any wheel of the vehicle, independently of the other wheels, while the brakes are set.

31. The combination with a vehicle, of braking-mechanism for a wheel of the vehicle, mechanism operated by momentarily-acting increased pressure tangentially of the wheel at the instant rotation of the wheel is arrested, and means controlled by said second-named mechanism, when operated as stated, to maintain braking pressure, but to a degree less than that necessary to exist to actuate said second-named mechanism.

32. The combination with a vehicle, of brake-devices for the wheels of the vehicle, means for operating said devices from a common source, and a plurality of individually operative means co-operating with said braking-devices and operating automatically to reduce the braking pressure on such wheels without affecting the braking pressure against the others of the wheels.

33. The combination with a vehicle, of brake-devices for the wheels of the vehicle, a single mechanism from which said braking devices are operated, and a plurality of individually operating means co-operating with said brake-devices and operating automatically to reduce the braking pressure on such wheels and prevent flattening thereof, without affecting the braking pressure against the others of the wheels.

34. The combination with a vehicle, of brake-devices for the wheels of the vehicle, a power device, mechanism operated by said power device and operating to actuate said brake-devices, and means associated with said mechanism and operating automatically to reduce the pressure of the brake-devices against any of the wheels through said mechanism, when the conditions presented are such that, if continued, flattening of the wheels would result, without affecting the braking-pressure applied by the others of said devices against any of the others of the wheels.

35. The combination with a vehicle, of brake-devices for the wheels of the vehicle, a fluid pressure operated power device, mechanism operated by said power device and operating automatically to reduce the pressure of the brake-devices against any of the wheels through said mechanism, when the conditions presented are such that, if continued, flattening of the wheels would result, without affecting the braking-pressure applied by the others of said devices against any of the others of the wheels.

36. The combination with a vehicle, of braking-mechanism for a wheel of the vehicle, and means associated with said braking mechanism operating automatically to reduce the pressure of the brake against the wheel when the conditions presented are such that, if continued, flattening of the wheel would result, and maintain such pressure below the point at which skidding of the wheel may occur regardless of the degree of pressure between the brake shoe and wheel.

37. The combination with a vehicle, of braking-mechanism for a wheel of the vehicle, and means associated with said braking-mechanism, and operating automatically to reduce the pressure of the brake against the wheel when the force exerted by the brake in a direction tangentially of the wheel exceeds a predetermined degree, and maintain such pressure below the point at which skidding of the wheel may occur regardless of the degree of pressure between the brake shoe and wheel.

38. The combination with a vehicle, of braking devices for the respective wheels thereof, a single mechanism from which said braking devices are operated, and a plurality of individually operative means cooperating with the respective braking devices and operating automatically to reduce the braking pressure applied to certain of said wheels when the tangential force exerted against the wheels exceeds a predetermined amount.

39. The combination with a vehicle, of braking means for the respective wheels thereof, a single mechanism from which said braking devices are operated, a source of compressed air for operating said mechanism, and a plurality of individually operative means cooperating with the respective braking devices and operating automatically to reduce the braking pressure applied to certain of such wheels, without affecting the braking pressure exerted by the braking devices cooperating with the others of said wheels.

40. The combination with a vehicle, of a braking device for a wheel of the vehicle, means for applying pressure to said braking device for setting the brake, and means operating automatically to reduce the power exerted by said first-named means against said braking device and involving a spring device the resistance of which is required to be overcome before said second-named means operate and which, when overcome, ceases to act against said second-named means.

41. The combination with a vehicle, of a braking device for a wheel of the vehicle, means for applying pressure to said braking device for setting the brake, and means operating automatically when the tangential force exerted by said braking device exceeds a predetermined degree, to reduce the power exerted by said first-named means against said braking device and involving a spring device the resistance of which is required to be overcome before said second-named means operate and which, when overcome, ceases to act against said second-named means.

42. The combination with a vehicle, of a braking device for a wheel of the vehicle, lever mechanism operatively connected with said braking device, means for actuating said lever mechanism, and automatically operating means adapted to reduce the leverage exerted against said braking device through said lever mechanism for preventing flattening of the wheel, said last-named means involving a spring device the resistance of which is required to be overcome before said last-named means operate and which, when overcome ceases to act against said last-named means.

43. The combination with a vehicle, of a braking device for a wheel of the vehicle, lever mechanism operatively connected with said braking device, means for actuating said lever mechanism, and automatically-operating means, operating, when the tangential force exerted by said braking device exceeds a predetermined degree, to reduce the leverage exerted against said braking device through said lever mechanism for preventing flattening of the wheel, said last-named means involving a spring device the resistance of which is required to be overcome before said last-named means operate and which, when overcome, ceases to act against said last-named means.

44. The combination with a vehicle of a braking device for a wheel of the vehicle, and lever mechanism operatively connected with said braking device for reducing the braking pressure at the braking device while the brake is set, and involving a releasable restraining device releasable when the tangential brake thrust exceeds a certain degree, said lever mechanism being constructed and arranged to cause, when operated, the tangential brake thrust to be reduced below that required for the releasing of said releasing device.

45. The combination with a vehicle, of a braking device for a wheel of the vehicle, lever mechanism operatively connected with said braking device for reducing the braking pressure at the brake device while the brakes are set, and automatic releasing means cooperating with said lever mechanism and so constructed and arranged that when operated they cannot be restored until the brake is released.

46. The combination with a vehicle, of a braking device for a wheel of the vehicle, lever mechanism operatively connected with said braking device for reducing the braking pressure at the brake device while the brakes are set, and operating automatically, when actuated, to reduce the braking pressure at the braking device and maintain it reduced until the brakes are released.

HARRY R. MASON.